INVENTORS:
CHARLES W. JOHNSON,
PAUL WEISS,
BY Robert J. Steinmeyer
THEIR ATTORNEY.

INVENTORS:
CHARLES W. JOHNSON,
PAUL WEISS,

BY Robert J. Steinmeyer
THEIR ATTORNEY.

INVENTORS:
CHARLES W. JOHNSON,
PAUL WEISS,
BY Robert J. Steinmeyer
THEIR ATTORNEY.

INVENTORS:
CHARLES W. JOHNSON,
PAUL WEISS,
BY Robert J. Steinmeyer
THEIR ATTORNEY.

Jan. 17, 1961 P. WEISS ET AL 2,968,789

FORM RECOGNITION SYSTEM

Filed Oct. 26, 1956 5 Sheets-Sheet 5

INVENTORS:
CHARLES W. JOHNSON,
PAUL WEISS,

BY Robert J. Steinmeyer
THEIR ATTORNEY.

2,968,789

FORM RECOGNITION SYSTEM

Paul Weiss and Charles W. Johnson, Syracuse, N.Y., assignors to General Electric Company, a corporation of New York Filed Oct. 26, 1956, Ser. No. 618,606
17 Claims. (Cl. 340—149)

This invention relates to form or character recognition systems. More particularly, the invention relates to a method and means for essentially eliminating the registration process in a form recognition system by obtaining intrinsic properties of the unknown shape or form which are invariant or at least semi-invariant with respect to the transformation of translation, rotation, and magnification of the unknown form to be recognized and which may if desired, provide information sufficient both to identify the form and to give a measure of its magnification relative to a standard form.

Most form recognition systems such as automatic document readers which have in the past been proposed essentially require that an unknown form be scanned by a reading device, such as a "flying spot" scanner or a curve follower, the sequence of electrical output signals of which are compared with sequences of stored standard signals which have previously been produced by the same reader from a group of forms which are the same as those which it is desired to selectively recognize. When the sequence of output signals from the reading device coincides with any one of the stored standard sequences of signals a recognition is indicated.

Since the position, orientation, and magnification of the unknown form to be recognized with respect to the scanning raster or reading area will very decidedly affect the nature of the output signals from the prior art reader or scanner, it is apparent that recognition of any given form or shape will occur only when the position, orientation and magnification of the unknown form with respect to the reading area is the same as was the position, orientation and magnification of the standard form from which the stored reference signals were read. For example, assume that a standard stored sequence of signals has been taken from a letter O which was one inch in height and positioned uprightly in the center of a five inch square reading pattern. The same letter O when presented as an unknown form may be two inches in height, positioned in the lower left hand corner of the reading area, and rotated through 90° so that its major axis or height dimension is horizontal rather than vertical. When a character or form has been subjected to such transformations of position, orientation, and magnification with respect to the reading pattern, it is said to be no longer in "registration" with the standard stored pattern, and some additional means must be provided to bring it into registration in order to recognize it as the same character.

From the above it is clear that in known systems, even if the characters to be recognized are prepared from the same standard type used to prepare the stored signals, either the reading or scanning mechanism must be maintained in perfect alignment or registration with a predetermined character position in a reading area or scanning pattern, or else the scanning mechanism must execute a rotational, translational and magnification search in order to insure that proper registration has been obtained so that recognition can occur. For example, if the scanning pattern is similar to a raster as known in the television art, the center of the raster must execute a slow translational search over the entire area of examination. In addition, this must be coupled with an even slower rotational motion, and to this must be added a still slower magnification or size search. Even for misalignments less than those assumed in the example of the letter O given above, this is clearly a time consuming and impractical process because of the large number of different combinations of position, orientation and size which must be assumed by the scan in order to exhaust all possibilities.

In other applications, one does not wish to read a preselected standard type but may, for example, wish to read any commonly used type or to read maps, photographs, drawings, or other documents or to recognize the image of an object. In such applications it may be desirable to know not only what the shape or form is regardless of its position or orientation in the reading area, but also to know how large it is in relation to the stored standard shape.

Various modified scanning or reading patterns have in the past been proposed to alleviate the registration problem. None of these, however, has been able to cope simultaneously with transformations of translation, rotation, and magnification which may, for example, arise from longitudinal, angular, or radial displacement of material to be read from the standard reading position.

In the system of the present invention the registration problem is essentially eliminated by basing the comparison and recognition not upon geometrical coordinate information concerning the unknown curve or shape as such, but rather by basing it upon a comparison of computed values of geometrical properties of the curve which are invariant, or at least semi-invariant, with respect to transformations of translation, rotation and magnification. For the purposes of this application, a property of a curve will be said to be invariant with respect to a given transformation or set of transformations when the property has a value which varies with a point traversing the curve but which, for a given point on the curve, does not change when the curve is mapped on another curve by any succession of applications of the transformation or transformations with respect to which the property is invariant. Similarly a property of the curve is said to be semi-invariant with respect to a given transformation when it has a value which changes by at most a constant additive term when the curve is mapped on another curve by any succession of applications of the transformation with respect to which the property is semi-invariant. Furthermore, it can be shown that the functional relationship between any two invariant properties characterizes the whole class of plane curves which can be mapped onto one another by a succession of applications of the transformations with respect to which the properties are invariant.

It is therefore an object of this invention to provide a method of and means for recognizing a character or form utilizing intrinsic characteristics of the form which are invariant or at least semi-invariant with respect to its orientation, position, and size.

It is a further object of this invention to provide a method and means of simplifying the registration process in a form recognition system.

It is a further object of this invention to provide a form recognition system which can determine both the shape and relative size of an unknown form.

Briefly stated, in accordance with one aspect of the invention, a form or character to be recognized is read by any scanning device which will produce a sequence of electrical output signals indicating any pair of coordinates at a series of points along the curve or form with respect to the coordinates of a standard reading area or scanning pattern or which will produce signals which are in any other way a function of the shape of the curve. This coordinate information is then supplied to a computer which determines certain properties of the form or curve which are wholly invariant or semi-invariant, that is, invariant to within at most a constant additive term, with respect to the transformations of translation, rotation or magnification. The output of the computer rather than the output of the reader, is then compared with a store of standard sequences of values of similar properties previously computed from known shapes. When a coincidence occurs, a recognition of the unknown shape is indicated no matter what the position, orientation or size of the unknown shape in the reading area may be. The identity of the unknown shape may simply be printed or otherwise displayed, or the information may be used to control any other apparatus or be recorded on a storage medium to be used as input data for a computer.

While the novel and distinctive features of the invention are particularly pointed out in the appended claims, a more expository treatment of the invention, in principle and in detail, together with additional objects and advantages thereof, is afforded by the following description and accompanying drawings of representative embodiments in which like reference characters are used to indicate like parts throughout, and wherein:

Figure 1:
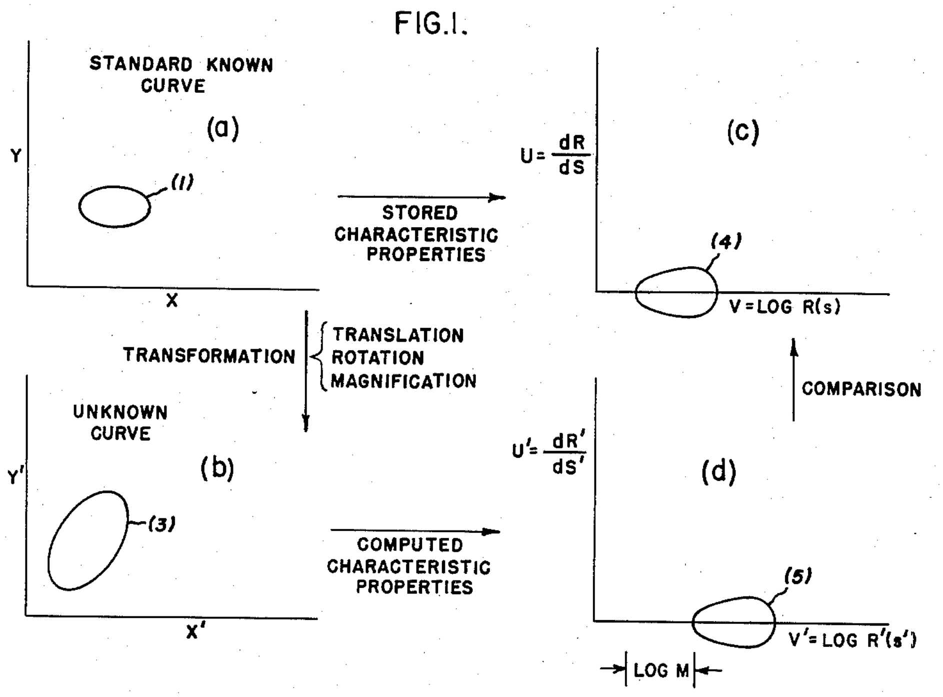
Figure 1 is a set of graphs illustrating relationships between typical invariant and semi-invariant curve properties utilized in the invention.
Figure 2:
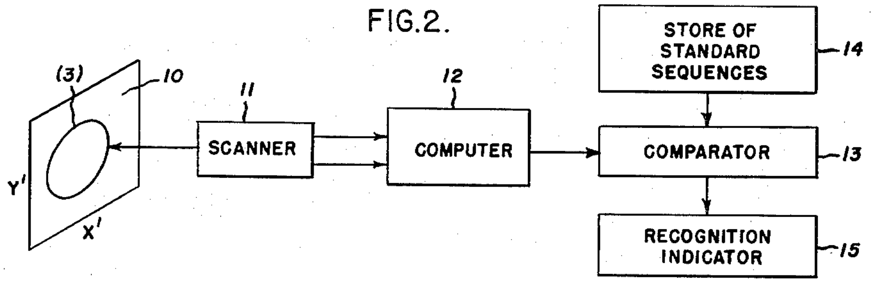
Figure 2 is a block diagram of the form recognition system of the present invention.

Turning now to Figure 1, there is shown a set of four graphs illustrating the principles upon which the system shown in the block diagram of Figure 2 operates. For a better understanding of the operation of the system of Figure 2 it is helpful to first consider the mathematical background of the problem as set forth in the graphs of Figure 1.

In graph ($a$) of Figure 1 there is shown a curve 1 which, for purposes of illustration only, is taken as an ellipse plotted in orthogonal $x$ and $y$ (Cartesian) coordinates which may be thought of as representing two perpendicular sides of a standard reading area or scanning pattern. The ellipse 1 illustrates a standard or known shape against which it is desired to compare any other ellipse positioned in the same plane and having the same shape or eccentricity, and to recognize it as an ellipse of the given eccentricity no matter how it may have been translated, rotated or magnified in the plane.

It will of course be understood that in speaking of "curve" recognition it is here intended to include the more general problem of "shape" or "form" recognition which latter can more readily be discussed in terms of "curve" recognition using the methods and standard terminology of elementary differential geometry. It is apparent that when a filled-in shape is to be dealt with its outline may be determined as a curve by standard photographic methods of differential enlargement and superposition of a positive and a negative. Alternatively, tracings of the outline of a shape may be made or the material to be read may originally be prepared or printed in the form of line drawings representing a shape or character. While the term "curve" will, therefore, be used throughout this application, it is to be understood that, in the sense noted, it is meant to include also shapes or forms having outlines or peripheries which are closed curves. Thus the "curve" 1 of Figure 1 may be simply a geometrically drawn ellipse, or it may be the known shape of a body of land or water appearing on maps of preselected areas. Of course, it may also be the outline of a letter O as discussed in the example given above. The system of the present invention will in any case automatically recognize the geometrical shape. The other properties of the object are assumed to be known from the nature of the particular application for which standard stored signals have been prepared. That is, whether curve 1 represents a missile, a letter O, or a particular island on a map is known from the general nature of the material being read.

In any event, the curve 1 of Figure 1($a$), whether it be an ellipse or any other shape, may in general be represented by parametric equations of the form (1)
$$x=x(t)$$
$$y=y(t)$$

where $t$ is a parameter. It is now desired to determine a unique set of properties of the curve which are independent of the transformations of rotation, translation, and magnification and which may therefore be used as standard stored characteristics of the curves.

Stated analytically, we wish a means of transforming curve 1 as defined by Equation 1 into a curve defined by new relations, (2)
$$u=u(s)$$
$$v=v(s)$$

where $s$ is arc length in the original curve 1, and where the functions $u$ and $v$ have the property of invariance to within at most a single constant translation when the transformations of (3)

translation
$$x'=x+k_1$$
$$y'=y+k_2$$

rotation
$$x'=x\cos\theta-y\sin\theta$$
$$y'=x\sin\theta+y\cos\theta$$

magnification
$$x'=mx$$
$$y'=my$$

are applied to the original curve defined by Equations 1. Here $k_1$, $k_2$, $m$, and $\theta$ are constants, $x$ and $y$ are the variables of the original curve and $x'$ and $y'$ are the variables of the new curve resulting from the stated transformations.

Now one pair of functions $u(s)$ and $v(s)$ which, for example, have the above stated properties are (4)
$$u=\frac{dR}{ds}$$
$$v=\log R(s)$$

where $dR/ds$ is the derivative or rate of change of the radius of curvature R of curve 1 with respect to its arc length $s$ and log $R(s)$ is the logarithm of the radius of curvature of curve 1 at various points along its arc length $s$.

While a purely formal proof of the invariance of the functions 4 under transformations 3 can be given, it is easier to simply note the fact that both the arc length and the radius of curvature of any curve are directly proportional to magnification and are independent of orientation or position in a given set of coordinates. Since the magnification factor, which we have called $m$, is the same for both the differential radius of curvature $dR$ and the differential arc length $ds$, it will cancel out of the ratio $dR/ds$, and we have $$(5)\qquad u'=\frac{dR'}{ds'}=\frac{dR}{ds}$$

$$v'=\log R'=\log mR=\log m+\log R$$

where the primes indicate evaluation of the functions $u$, $v$ in the $x'y'$ system resulting from the transformations 3 being applied to curve 1. Comparing 4 and 5 we conclude that, $$(6)\qquad u'=u$$
$$v'=\log m+v$$

that is, the function $u$, as defined above, is invariant under the stated transformations 3 and the function $v$ is semi-invariant, i.e. it is invariant to within a constant additive term which here is the logarithm of the magnification factor, $m$. In other words, the function $u=dR/ds$ is invariant under translation, rotation, and magnification and the function $v=\log R(s)$ is invariant under translation and rotation, but is increased by a constant additive magnification term under the transformation of magnification.

The implications of these relationships are set forth in part by the legends in Figure 1. Thus if one desires a form recognition system in which one of the items to be stored in the memory for recognition has a shape such as that of curve 1 in graph ($a$), for example, one stores in the memory not the shape or curve 1 itself, but rather the curve 4 derived from curve 1 by relations 2 and shown plotted in graph ($c$). Now, when a curve which has the same shape as curve 1 but which due to failure of registration or to any other reason may have been subjected to any of the transformations of translation, rotation or magnification thus resulting in curve 3, shown plotted in graph ($b$), is presented to the scanning or reading device according to the invention the computer derives from it a new curve 5 by using the same functional relationships 2 that were used to derive curve 4 from curve 1. If the computed characteristic properties of curve 3, as represented by curve 5, are now compared with the stored characteristic properties of curve 1, as represented by curve 4, they will be found to differ by at most a constant translational or additive term in spite of the far greater difference between curves 1 and 3. This simple constant term translational difference is readily eliminated by comparison techniques which will be indicated in detail below. It will then always be true that curves 4 and 5, whatever arbitrary shape they may have, will coincide or be identically the same when the curve 3 has been derived from curve 1 by any combination of the transformation 3. Furthermore, since the constant translational term which has been eliminated is the logarithm of the magnification factor, it may additionally be used as a measure of the size of the unknown curve being read relative to the size of the stored standard curve. Of course, if the curve being read is the same size as the stored curve, the constant difference term will be zero since $m$ then equals 1 and the logarithm of 1 equals zero. Alternatively, if one does not wish to know the relative sizes of the curves, both of the functions $u$ and $v$ may be chosen to be invariant with respect to all three of the transformations 3 and the constant difference term will then reduce to zero in all cases where the curves have the same shape.

Figure 11:
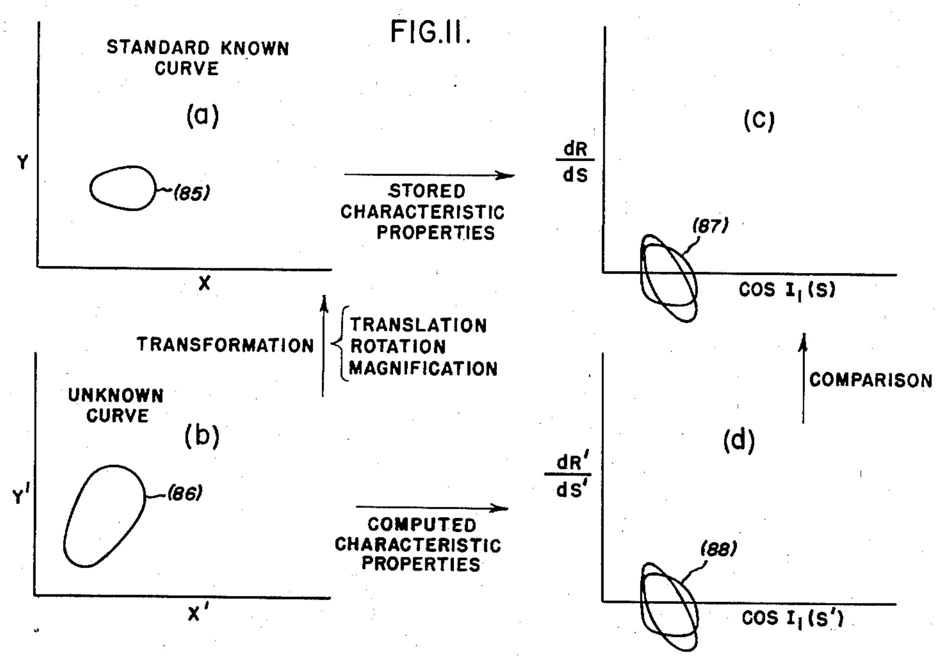
Figure 11 is a set of graphs similar to those of Figure 1 illustrating functional and other relationships between invariant curve properties utilized in another embodiment of the invention.

Graphs illustrating this latter relationship are shown in Figure 11 which will be discussed in detail below.

One form of novel apparatus for carrying out the process based on Figure 1 is generally indicated by the block diagram of Figure 2. Here curve 3 is shown presented on a reading area or scanning pattern 10, the sides of which may be considered to correspond to the axes $x'$, $y'$, respectively of graph ($b$) in Figure 1. Block 10 could, for example, be a television type raster in a flying spot scanner 11. However, in order to eliminate problems relating to the sequence in which bits of information are obtained in such a scan in relation to the sequence in which they occur around the perimeter of the curve 3, it is preferred to use for scanner 11 a modified form of a curve follower such, for example, as that disclosed in U.S. Patent 2,499,178 to T. M. Berry et al. In this system block 10 represents the Berry et al. reading table on which the curve to be followed is displayed or plotted.

In the above-mentioned U.S. Patent 2,499,178 there is disclosed a photoelectric scanning head which is constrained to follow around the path of a completely closed curve and simultaneously to control the worktable of a machine tool which cuts a duplicate of the original curve. Certain aspects of the curve follower of T. M. Berry et al. are also described in an article entitled "Optical Contour Follower" by T. M. Berry in the "General Electris Review," June 1950 (pp. 44–47). As adapted to the present invention, it is only necessary to have the "$x$ lead screw" and the "$y$ lead screw" which, in the device of the Berry et al. patent, drive their work table above which the machine tool is positioned, instead drive the movable wiper arms of potentiometers connected across standard voltage sources. Thus arranged, the output of the scanner system constitutes analog voltages, the magnitudes of which represent the $x'$ and $y'$ coordinates respectively of curve 3 rather than table motion as in Berry et al.

Figure 3:
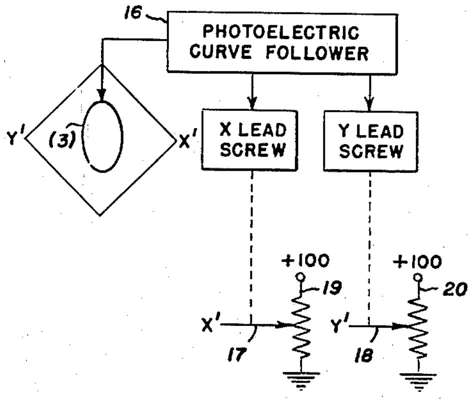
Figure 3 is a schematic diagram showing how a known curve follower may be adapted for use in the system of the present invention.

This arrangement is shown in Figure 3 wherein curve 3 is shown as being read by a photoelectric curve follower 16, the details of which are fully disclosed in the patent to Berry et al. It should, of course, be understood that any similar device, that is, any electromechanical, electrical, or electronic device which is capable of reading or determining the coordinates of a sequence of points along the arc length or perimeter of a curve, can also be used. The curve follower shown in Figure 3 by way of example drives $x$ and $y$ lead screws which are denominated as such in the Berry et al. patent.

As adapted to the present system, however, these lead screws drive wiper arms 17 and 18 of potentiometers 19 and 20 respectively. One end of each of the potentiometers 19 and 20 is grounded and the other end of each is connected respectively to separate sources of unidirectional voltage which may, for example, have a value of 100 volts. Thus, as the wiper arms are driven along the potentiometers by the curve follower, the voltages $x'$ and $y'$ on wiper arms 17 and 18 may vary from 0 to 100 volts and will be analog representations of the coordinates of curve 3. It will of course be understood that suitable zero settings to determine coordinate axes may be adapted to accommodate the nature and dimensions of any particular material being read.

Figure 4:
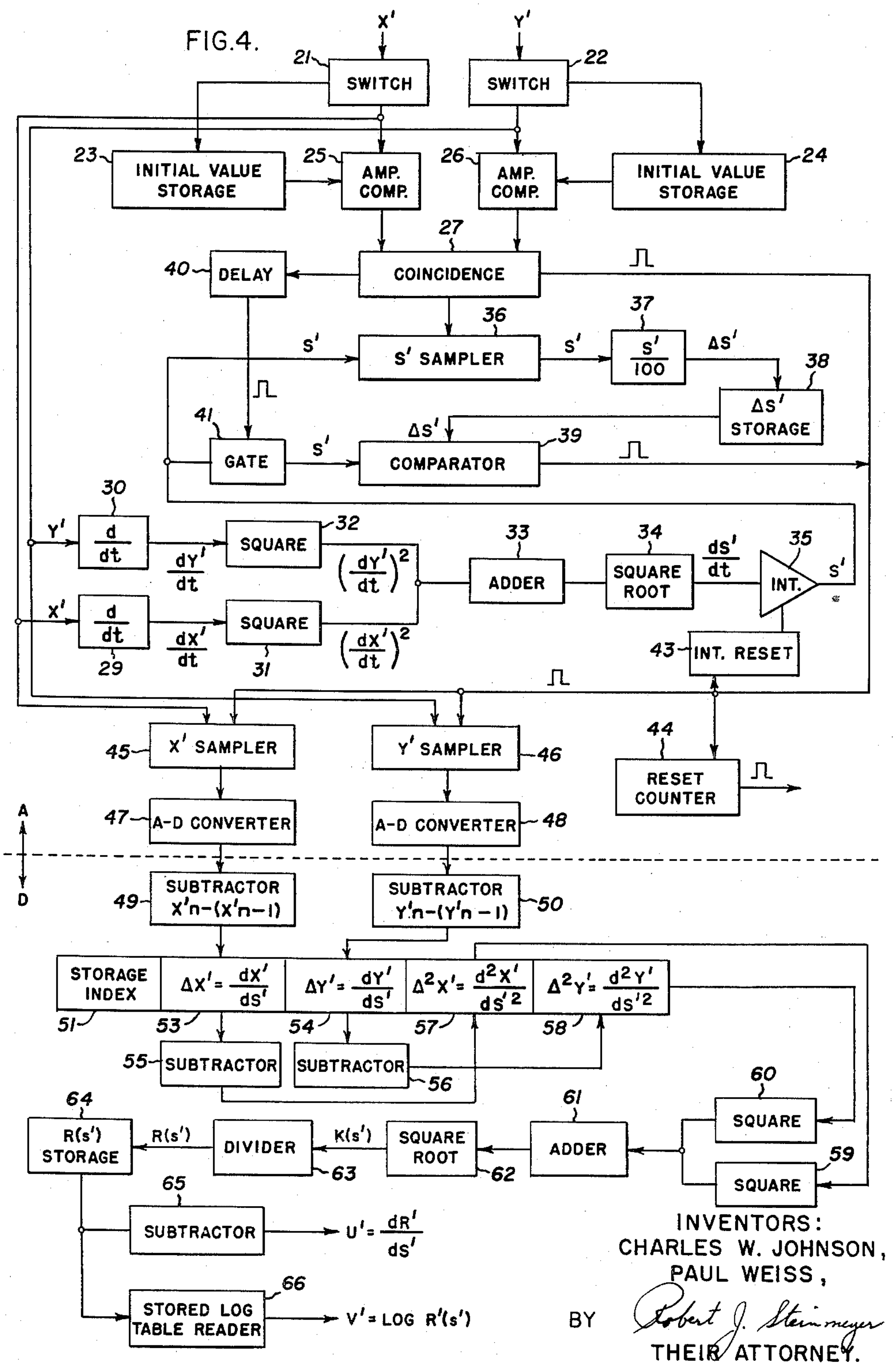
Figure 4 is a block diagram of a computer utilized in one embodiment of the invention.

These voltages $x'$ and $y'$ are then applied to a special purpose computer, shown as block 12 in Figure 2 and shown in detail in Figure 4, which computes $dR/ds$ and log $R(s)$ for the curve 3. The computed values are applied to a comparator 13 to which is also applied standard stored values of the same functions or properties of various known or standard curves from storage or memory element 14. When a coincidence occurs the comparator output activates any conventional recognition indicator 15. Recognition indicator 15 may be a bank of indicator lamps, or it may be an automatic typewriter or any other means for recording the identity of the curve on any storage medium or for transmitting the information as an input to a computer, a sorting machine, an automatic machine tool, or to any other apparatus.

Turning now to Figure 4 there is shown a detailed block diagram of the special purpose computer indicated generally as block 12 in Figure 2. Voltages $x'$ and $y'$, derived from potentiometer arms 17 and 18, are applied to switches 21 and 22 respectively. These switches are either single pole double throw switches or their electromechanical or electronic equivalents. As will be understood by those skilled in the art, when the photoelectric scanner is initially set at any arbitrary point on the curve to be read, switches 21 and 22 apply the corresponding $x'$ and $y'$ potentials to storage elements 23 and 24 respectively. Elements 23 and 24 may conveniently be servo-controlled potentiometers, of the type commonly used in electronic analog computers, as described, for example in the book "Electronic Analog Computers," by G. A. Korn and T. M. Korn, published by McGraw-Hill, New York, N.Y., 1952. These potentiometers are here set to retain the initial or beginning point values of $x'$ and $y'$ by breaking their feedback loop when switches 21 and 22 are opened. Elements 23 and 24 could, alternatively, be capacitors which are charged to the initial values of $x'$ and $y'$. When these initial values or conditions have been set into the apparatus, the scanning cycle around the perimeter of the curve to be read is begun and switches 21 and 22 are thrown to apply the subsequent new values of $x'$ and $y'$ to amplitude comparators 25 and 26 respectively to which the initial values of $x'$ and $y'$ are also applied from storage elements 23, 24. Comparators 25 and 26 may conveniently be differential relays driven by balanced D.-C. amplifiers in a manner well known in the analog computing art, or they may be any other suitable amplitude comparing circuit which emits a pulse when its two inputs have the same value. The stored initial values of $x'$ and $y'$ are applied to one input of each comparator and subsequent values of $x'$ and $y'$ are applied to the other input from switches 21 and 22. The relay arm of the comparators will move from one contact to another whenever the variable input passes through the value of the stored input and the arm may conveniently be arranged to thereby discharge a capacitor or in any other manner cause a pulse to be transmitted to coincidence circuit 27.

It is apparent that, particularly if irregular curves are being read, either $x'$ or $y'$ separately may again assume its initial value before the complete curve has been traced out. However, when both $x'$ and $y'$ return to their initial values, coincidence circuit 27 emits a pulse which indicates that one complete scan around the curve has been made.

During the first complete scan around the perimeter of the curve, voltages $x'$ and $y'$ are also applied to an analog computer loop which computes the total arc length $s'$ around the perimeter of the curve. This loop includes differentiators 29 and 30 to which voltages $x'$ and $y'$ are respectively applied from switches 21 and 22. Differentiators 29 and 30 may be "operational" or high gain D.-C. amplifiers with capacitive input and resistive feedback of the type commonly employed in analog computers, or if noise becomes troublesome, they may be any known convenient approximating circuit for taking the derivative of $x'$ and $y'$ with respect to time.

The outputs of elements 29 and 30 are respectively $$\frac{dx'}{dt} \text{ and } \frac{dy'}{dt}$$

where the notation indicates the first derivative of $x'$ and $y'$ with respect to time. These derivatives are squared by elements 31 and 32 respectively which may, for example, be servo-controlled potentiometers connected in squaring circuits in a manner well known in the art. The squared derivatives are then added in adder 33 which may be a simple summing amplifier having two inputs. The square root of this sum is taken by element 34 which may, for example, consist of a servo-controlled potentiometer and operational amplifier connected to solve an implicit equation of the form $a-b^2/100=0$ where $a$ is the input and $b$ is the output of the circuit and will equal $-10\sqrt{a}$ as is well known in the art. Here the input, $a$, is the output of adder 33 and the output, $b$, after simple division by 10 and inversion to change its sign, is $ds'/dt$. Of course, element 34 can also be any other conventional means to compute the square root.

It will be seen that elements 29 through 34 are an analog instrumentation of the well known relation $$\frac{ds'}{dt}=\sqrt{\left(\frac{dx'}{dt}\right)^2+\left(\frac{dy'}{dt}\right)^2} \tag{7}$$

where, as noted above, $s'$ is arc length of the unknown curve of which $x'$ and $y'$ are the Cartesian coordinates. The derivatives are taken with respect to time.

The output $$\frac{ds'}{dt}$$

of element 34 is applied to an integrator 35 which may conveniently be an "operational" or high gain D.-C. amplifier with capacitive feedback and resistive input of a type well known in the art. The output of amplifier 35 will at any instant have a value representing the total arc length $s'$ which has been traced out by the curve follower up to that instant. This output is applied to a sampler 36 which may conveniently be any well known gating circuit which is normally closed or nonconducting in the absence of an applied pulse. When coincidence circuit 27 emits a pulse indicating that one complete scan of the perimeter of the curve has been made, the gating circuit or sampler 36 is opened to read the output of integrator 35 which at that instant represents the total arc length of the curve.

This value of $s'$ is applied to an element 37 which divides $s'$ by any convenient integral factor such as 100 in order to determine a value $\Delta s'$ which is an integral submultiple of the total arc length and which may be used as a sampling interval in the next scan around the curve. Element 37 may, for example, be a simple potentiometer or voltage divider permanently set to have an output which is one one-hundredth of its input. This output, $\Delta s'$, is applied to a storage element 38 which may be another servo-controlled potentiometer of the type used for 23 and 24. The stored value of $\Delta s'$ is applied as one input of a comparator 39, which may be a differential relay of the type used at 25, 26, or which may be any well known amplitude comparing circuit that emits a pulse when its two inputs have the same amplitude.

At the same time that coincidence circuit 27 emits a pulse to sampler 36 it also emits a pulse to delay element 40. This element may be any conventional means to delay the pulse by one pulse duration which is selected to be negligibly short by comparison with the order of magnitude of the value of $\Delta s'$ to be expected from the particular curves being read. The delayed pulse from element 40 opens a normally closed gate 41 which may be controlled by a bistable circuit so that once opened it remains open until closed by another pulse as from reset counter 44 to be described below. When gate 41 is opened at the beginning of the second scan around the curve, the output $s'$ of integrator 35 is applied as a second input to comparator 39 which, as noted above, has $\Delta s'$ as its other input and which emits a pulse whenever its two inputs become equal.

A pulse from coincidence circuit 27 indicating the end of the first scan is also applied to an element 43 to reset integrator 35 to zero. Element 43 may consist of any convenient means for momentarily grounding or otherwise discharging the feedback capacitor of integrator 35 and may include such delay as is necessary. This initial pulse from coincidence circuit 27 is also applied to reset counter 44 which, in a manner to be described below, will emit a pulse after the second complete scan of the curve indicating that the reading operation of one curve has been completed.

It will here be noted that during the first scan around the perimeter of the curve, a value $\Delta s'$ equal, for example, to one one-hundredth of the curve's total arc length is computed and stored in element 38. At the end of the first scan gate 41 is opened and simultaneously integrator 35 is reset to zero so that it may again begin to compute arc length. During the second scan around the curve, whenever the arc length traveled over by the curve follower reaches a value, as measured by the output $s'$ of integrator 35, which is equal to the previously computed value $\Delta s'$, comparator 39 emits a pulse. This pulse, like that from coincidence circuit 27, is applied to reset element 43 of integrator 35 and to reset counter 44. Integrator 35 then again begins to compute arc length until a value $\Delta s'$ is again reached, at which time comparator 39 again emits a pulse.

Since $\Delta s'$ is equal to one one-hundredth of the total arc length, comparator 39 will emit 100 pulses during the second scan around the curve. Coincidence circuit 27 will have emitted one pulse at the end of the first scan, and will emit a second pulse at the end of the second scan. This second pulse, however, will coincide with the 100th pulse from comparator 39. Reset counter 44 is therefore selected to count to 101, or more generally, to $k+1$, where $k$ is the division factor of element 37, and then emit a pulse. Any convenient counting circuit may be used to obtain this pulse which is used to indicate the end of the second scan of one complete reading operation. This pulse, for example, is used to reset gate 41 to a closed condition. It may also reset switches 21 and 22 and, if desired, may control an automatic feed mechanism to position the next character or curve under the reader.

The pulses from comparator 39 and coincidence circuit 27 are also applied to elements 45 and 46 as well as to elements 43 and 44. Elements 45 and 46 are samplers which may consist of gating circuits of any convenient type which have the voltages $x'$ and $y'$ as their other inputs. When pulses are applied from coincidence circuit 27 or comparator 39, gates 45 and 46 are opened for the pulse duration and sample the values of voltages $x'$ and $y'$. Since pulses occur at the end of each interval of arc length $\Delta s'$, it is apparent that sampling gates 45 and 46 read the $x'$ and $y'$ coordinates of the curve at equal intervals $\Delta s'$ of arc length. The analog voltages $x'$ and $y'$ representing these curve coordinates are then applied to analog-to-digital converters 47 and 48 respectively. These converters may be of any conventional type which has a binary or other digitally coded output corresponding to the amplitude of the analog voltage input.

It will be noted that the portion of the computer above the dashed line in Figure 4 is primarily an analog system as indicated by the letter A while the portion below the dashed line is primarily a digital system as indicated by the letter D.

The outputs of converters 47 and 48 will be a series of numbers representing the values of $x'$ and $y'$ coordinates of the unknown curve at equal intervals of arc length and in sequential order around the perimeter of the curve. It will of course be understood that other means of obtaining this information could be used particularly if a different curve scanning or reading system were used. The television type scan, for example, would require apparatus different from that shown in blocks 21 through 48 in order to obtain the same information which is here obtained as the outputs of converters 47 and 48. The essential feature is that the above noted sequenced coordinate information be obtained at equal intervals of arc length so that the above noted characteristics of the curve may be computed as a function of arc length. It will be recalled that the functions 4 $u=dR/ds$ and $v=\log R(s)$ both have arc length $s$ as the independent variable. Hence, it is desirable to compute these properties from coordinate data taken at equal intervals, $\Delta s'$, of arc length. Furthermore, by determining this interval $\Delta s'$ as a fixed fraction of the total arc length of the particular curve being read, it is possible to obtain a standard number of coordinate readings for curves of different total arc lengths thus simplifying the comparison process to be described below. The apparatus discussed above is a preferred illustrative example of one means for obtaining such coordinate information. If the $x'$ and $y'$ coordinate voltages were directly recorded as analog voltages on a magnetic drum, for example, it would be necessary to regulate the playback speed of the drum so that the coordinate information from curves of different total arc lengths would be played back in a standard total time and sampled at equal time intervals in order to obtain same standardizing effect which is here obtained by sampling at equal increments of arc length which are a fixed fraction of the total arc length of the unknown curve.

As noted above these samples are converted to digitally coded values and the rest of the system may conveniently use digital rather than analog computing techniques. As in the analog portion of the system, the individual operations will be indicated in block form. Any well known means either of the digital or of the analog type, having the transfer functions indicated by the block may be used to carry out each of the particular operations in the order indicated. Suitable digital apparatus for the individual operations is, for example, described in the text and bibliography of the book "High Speed Computing Devices" by the staff of the Engineering Research Associates, published by McGraw-Hill, New York, 1950.

The $x'$ and $y'$ coordinates read at intervals $\Delta s'$ are applied from converters 47 and 48 to subtractors 49 and 50 respectively, which are assumed to include the necessary storage facilities. Subtractors 49 and 50 take the first difference of consecutive values of the coordinates, $\Delta x'=x'_n-(x'_{n-1})$ and $\Delta y'=y'_n-y'_{n-1}$ respectively. Since these values are taken at equal intervals $\Delta s'$ the value of which may be made arbitrarily small, the differences $\Delta x'$ and $\Delta y'$ may be taken as values of the first derivatives of $x'$ and $y'$ with respect to arc length. That is $\Delta x'=dx'/ds'$ and $\Delta y'=dy'/ds'$. These values are read into a storage medium which may, for example be a magnetic drum, having an index or address track 51 and parallel storage tracks or sections 53, 54, 57, and 58. These first differences are read out of the storage medium by subtractors 55 and 56 which take the second differences, that is the difference between consecutive values of the first differences, and then read these values into storage sections 57 and 58. For the reasons outlined above, these second differences $\Delta^2x'$ and $\Delta^2y'$ will represent the second derivatives $d^2x'/ds'^2$ and $d^2y'/ds'^2$. With 100 sampling intervals there will of course be 101 pairs of coordinate values and 100 first differences. One may also obtain 100 second differences by taking a difference between the last and the first value of the first difference. This, of course, is possible on the assumption that one is dealing with a closed curve for which the values would be cyclical.

It is well known that the curvature, K, of a curve is equal to $$\sqrt{\left(\frac{d^2x}{ds^2}\right)^2+\left(\frac{d^2y}{ds^2}\right)^2}$$

and that the radius of curvature, R, equals $1/K$. Values of R as a function of $s'$ may therefore be computed by elements 59 through 63 or any other elements which instrument the above relationship. Values of the second difference are read out of storage tracks 57, 58 and squared by elements 59 and 60, the outputs of which are added by element 61. Elements 62 takes the square root of this sum and, in accordance with the above noted formula, will have an output $K(s')$ representing the curvature of the curve being read as a function of its arc length. The reciprocal of this value is taken by divider 63 which will therefore have an output R($s'$) which is radius of curvature as a function of arc length. This output is read into storage element 64.

Having R($s'$) it is now possible to compute the characteristics function 4, $u=dR/ds$ and $v=\log R(s)$. Values of R($s$) are read by subtractor 65 from storage 64 and first differences taken. The output of subtractor 65 is therefore a series of 100 values for $$u'=\frac{dR'}{ds'}$$

Values of R($s'$) from storage 64 are also read by an element 66 which, from stored logarithm tables or by other means, finds the log of those values. Elements 66 therefore has the function $v'=\log R'(s')$ as its output.

It will be recalled that these two functions $u'$ and $v'$ were the characteristic functions or curve properties set forth in Equation 5 above to be computed by block 12 of Figure 2.

Figure 5:
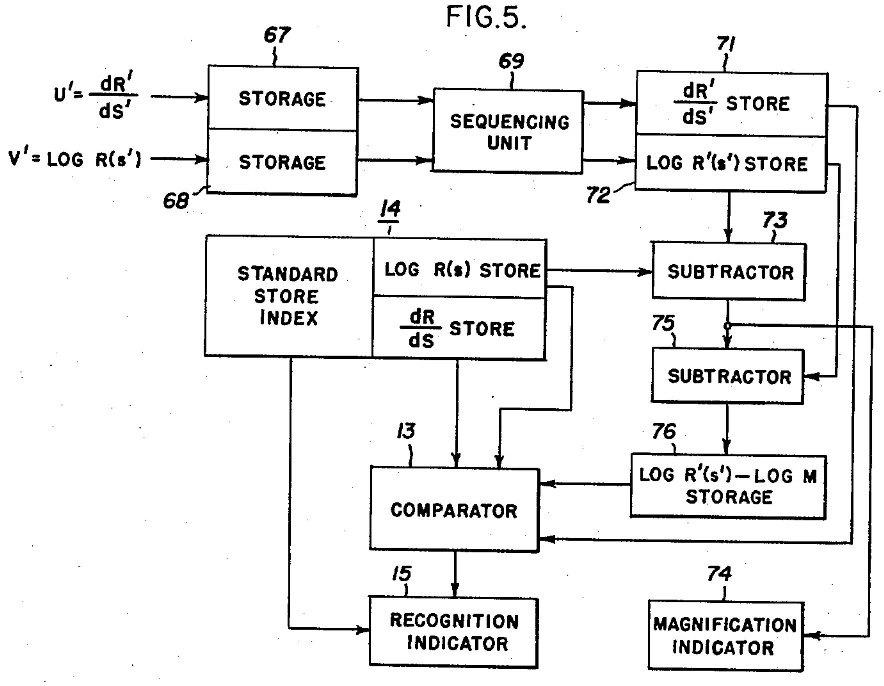
Figure 5 is a block diagram of the comparator portion of the system of Figure 4.

As shown in Fig. 5, these values of $u'$ and $v'$ are sent to storage elements 67 and 68 respectively. As may be seen by reference to graphs ($b$) and ($d$) of Fig. 1, when values of $u'$ and $v'$ are computed in pairs for points taken in sequence around curve 3 it may happen that, as shown in graph ($d$), there may be two points on curve 3 which have the same value of $v'$ but different values of $u'$. Furthermore, the starting point at which one begins to follow the curve is entirely arbitrary. Hence it is desirable to arrange the computed values of $u'$ and $v'$ in a standard sequence for comparison with the sets of standard values for known curves stored in element 14.

This sequencing is done by an element 69 which reads the stored values of $u'$ and $v'$ in elements 67 and 68 respectively, selects the smallest value of $v'$ having the smallest corresponding value of $u'$ and reads the pair of values into storage elements 71 and 72. This process is repeated until all of the one hundred computed pairs of values have been read out and stored in primary ascending order of $v'$ and secondary ascending order of $u'$ in elements 71, 72. The corresponding values for standard curves which the system is equipped to recognize are stored in a similar ascending sequence in storage element 14. Furthermore the relative sizes of the various stored standard curves the system is equipped to recognize may conveniently be chosen so that the smallest value of the radius of curvature and hence of $v$ occurring in each curve is the same as between the various stored standards so that each of the stored sequences of $\log R(s)$ will start with the same minimum value. This smallest value of $\log R(s)$ from storage 14 is now subtracted from the smallest value of $\log R'(s')$ from storage element 72 by subtractor 73. As may be seen by reference to graphs ($c$) and ($d$) of Figure 1 and to Equation 6 above, this difference is equal to $\log m$, where $m$ is the magnification factor of the unknown curve with respect to the standard known curve. This difference may therefore be applied directly to a magnification indicator 74 which may, if desired, include any convenient means for finding the antilogarithm and displaying this value of $m$, for example, as a printed numerical value or a meter reading. Alternatively $\log m$ itself may be displayed as a direct measure of the relative magnification of the unknown curve.

Log $m$, which is the output of subtractor 73 is also subtracted by subtractor 75 from all computed values of $\log R'(s')$ which have been stored in element 72. The new values of ($\log R'(s')-\log m$) are now placed in storage element 76. This subtraction operation merely amounts to shifting the curve 5 in graph ($d$) of Figure 1 to the left by an amount equal to $\log m$ so that it will fully coincide with curve 4 of graph ($c$). The pairs of values of ($\log R'(s')-\log m$) from 76 and $dR'/ds'$ from 71 are now repeatedly and cyclically applied to comparator 13. Simultaneously similar sequences of pairs of stored values for standard curves are also applied to comparator 13 from a search through memory or storage element 14. When a coincidence in all values in the sequence of 100 pairs of values occurs, a recognition indicator 15 is actuated and caused to read the index, which is here the track number for a particular curve rather than the address within a track, of the standard storage element 14 in order to determine what shape the unknown curve has. If no coincidence occurs after a complete search through standard storage element 14, it may be concluded that the unknown curve has a shape different from that of any which has been stored in the system.

It will of course be understood that while a separate block has been used to indicate each of the necessary computing and storing steps, many simplifications will be apparent to those skilled in the art. For example, the various storage or memory elements may in fact be different portions of a single memory device some portions of which, with suitable erasure techniques, may be used for more than one purpose at different points in the routine.

It will also be understood that any desired set or sets of standard curves may have their identifying properties stored in element 14. Thus, one may wish to recognize the outlines of a specific group of military targets or of navigational landmarks on an aerial photograph. Alternatively, one may wish to recognize the outlines of each character of a standard type font alphabet or of each character in any one of a number of commonly used type fonts. The number of different characters or curves which can be recognized is of course determined by the storage facilities available. The storage requirements are, however, greatly reduced by the fact that one is comparing not the curves themselves, but rather their computed invariant properties.

While the invariant $dR/ds$ and the semi-invariant $\log R(s)$ have been used in the above illustrative embodiment of the invention, it will of course also be understood that other functions or properties of curves which are invariant or semi-invariant under the transformations 3 of translation, rotation and magnification may also be used. One may be more desirable than another depending upon the general nature of the class or type of forms to be read.

For example, the curvature, K, of a straight line is zero and consequently the radius of curvature, R, approaches infinity as a curve approaches a straight line. Strictly speaking the radius of curvature R is undefined for a straight line. In practice divider 63 which computes R($s'$) from K($s'$) may contain any convenient means to limit the magnitude of its output as its input R($s'$) becomes arbitrarily small so that the system will recognize curve segments which approach a straight line as nearly as desired.

On the other hand, the curvature K of a straight line is zero but becomes very large at sharp corners such as the corner of a square or the intersection of two straight lines. In practice the curvature will never become infinite because any physical intersection of two straight edges is in fact rounded to a certain extent in the physical medium in which it is drawn. The curve follower sees such a point as one of large but not of infinite curvature. Conversely, the radius of curvature at such a point becomes very small.

While the embodiment of the invention illustrated in detail above has used an invariant, $dR/ds$, plotted against a semi-invariant, $\log R(s)$, in order to characterize a large and general class of curves, it will also be realized that in some applications one such property may be sufficient to identify the curve and its use may result in considerable simplification of the computing and comparison system. For example, either the output of block 62, representing 100 values of the curvature K, a semi-invariant, or either of the individual outputs of blocks 65 or 66 in Figure 4, representing 100 values of $dR/ds$ and $\log R(s)$ respectively, can be stored as single sequences of values for points taken sequentially around the perimeter of a curve and compared individually with their stored standard sequence counterparts. In effect one can directly plot a single computed characteristic as a function of arc length rather than as a function of a second computed characteristic.

As a further alternative these sequences of 100 values can be converted back to a continuous analog voltage (or can be computed by wholly analog methods) and then compared with stored continuous values of similar analog functions to achieve recognition. For the case of curvature K, plotted against arc length, $s$, of figures consisting of a plurality of intersecting straight line segments, this latter arrangement gives an output consisting of a series of pulses occurring at the corners of the figure where the curvature becomes large. Since the curvature may be either positive or negative depending on the direction of bending, this plot of K as a function of $s$ results in a series of positive and negative pulses spaced at intervals determined by the lengths of the straight line segments.

Figure 6:
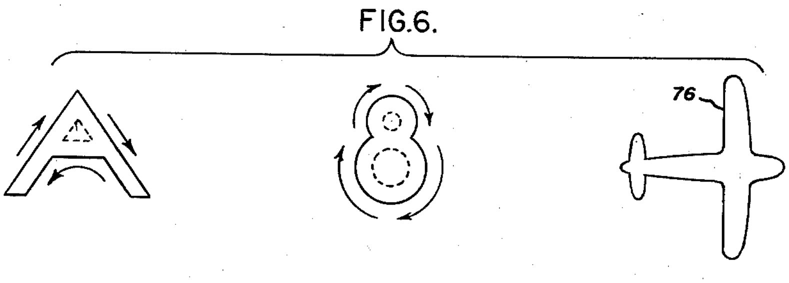
Figure 6 illustrates other typical curves or shapes which may be read by the system of the present invention.

Which of the above mentioned possible invariant or semi-invariant properties of the curve is the most desirable from the point of view of accuracy and simplicity and economy of instrumentation is determined largely by the type and number of different curves one wishes to recognize. Thus referring to Figure 6 the capital letter A has a solid outline which the curve follower would read which consists of straight line segments and sharp intersections. The Figure 8 consists of arcs and intersections, while the outline of the airplane 76 includes arcs, straight line segments, and sharp intersections.

The plot of one computed characteristic against another, such as $dR/ds$ against $\log R(s)$, will provide a cyclical or closed curve form for the computed characteristics which simplifies the computing and comparison process. Thus, if K is computed and plotted against $s$, $s$ will equal zero at the point where the curve reader starts and will equal the total arc length at the end of one complete scan. To each value of $s$ there will correspond a value of K but the plot of this function will not be a closed curve since $s$ does not come back to zero numerically. Furthermore, the sequencing of the computed values in ascending order of $\log R(s)$ by sequencing unit 69 provides a fixed starting point for the comparison process. If values of a single invariant, such as $dR/ds$, as a simple function of arc length are stored for comparison, there is no guarantee that the starting point on the unknown curve being read will be the same as was that used to compute the standard stored values. This problem may, however, be solved by simply shifting the computed values for the unknown curve cyclically for comparison with each of the standard stored sequences in all possible phase relations. Alternatively, some unique point of a curve, such as an inflection point for which the second derivative is zero, can be determined by computation and used as an arbitrary starting point from which to read the sequence of values. Both of these solutions, however, require additional time and equipment.

It should further be noted that the various measures of curvature noted above are not the only properties of geometrical figures which are invariant under the transformations 3. In general, angular relationships or ratios or other properties which are dimensions in the usual mathematical sense of not being expressed in terms of length but rather as a pure number, will be invariant under the transformations 3.

Figure 7:
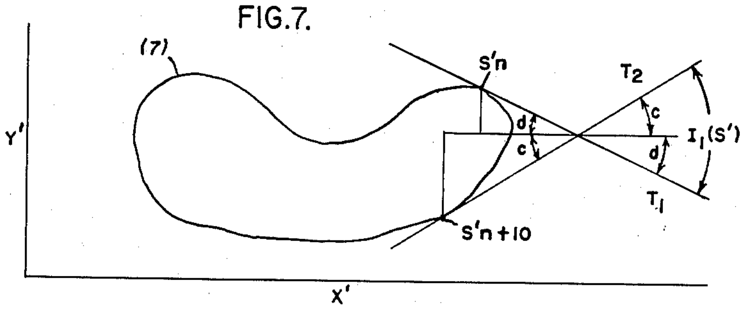
Figure 7 is a graph illustrating another invariant curve property which may be utilized in the invention.

In Figure 7, for example, there is shown a curve 7 having tangents $T_1$ and $T_2$ drawn to points $s'_n$ and $s'_{n+10}$ on the curve. The angle $I_1(s')$ between these tangents is another invariant under transformations 3.

It will be noted that angle $I_1(s')$ consists of the sum of angles $c$ and $d$. By a well known trigonometric relationship one may therefore write, (8) $\cos(I_1) = \cos(c+d)$
$= \cos(c)\cos(d) - \sin(c)\sin(d)$ (9) $\cos(c) = dx'/ds'$ at point $s'_{n+10}$
$\cos(d) = dx'/ds'$ at point $s'_n$
$\sin(c) = dy'/ds'$ at point $s'_{n+10}$
$\sin(d) = dy'/ds'$ at point $s'_n$ It will be recalled that these values of the first derivative were computed in the system shown in detail in Figure 4 and were stored in elements 53 and 54 as sequences of 100 values for points $s_1 s_2 \ldots s_{100}$ around the curve. Here we may represent any one of these points generally as $s_n$. It then follows that $$s_{n+10} = s_n + 10kL$$

where $k$ is the division factor of element 37 and L is the total length of the curve as computed on the first scan by integrator 35.

It will of course be understood that the two points at which tangents are drawn could be spaced at any convenient distance apart along the curve. Spacing these points 10 sampling intervals apart in a system using 100 sampling intervals is merely suggested as a convenient spacing selection.

Figure 8:
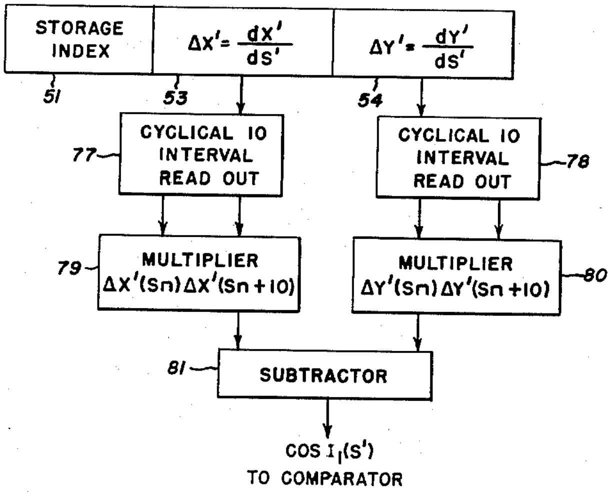
Figure 8 is a block diagram showing how the computer of Figure 4 may be modified to compute values for the invariant of Figure 7.

Relationship 8 may be instrumented as shown in Figure 8. It will be understood that the system of Figures 3 and 4 would be used up to and including storage elements 51, 53, and 54 which are also shown in Figure 8. Instead of computing $dR'/ds'$ and $\log R'(s')$, however, we wish to compute $\cos I_1(s')$ as a function of $(s'_n, s'_{n+10})$, that is, as a function of arc length.

This may be done by cyclically reading out of storage element 53 pairs of values of $\Delta x'$ spaced ten arc length intervals apart in the sequence of stored values of $\Delta x'$ as shown at 77 in Figure 8. A similar process is carried out for $\Delta y'$ read out element 78 reading values from storage element 54. Elements 77 and 78 may, for example, be gates controlled by clock pulses synchronized with the rotation of the storage drum so that the values are read out in the order 1, 11; 2, 12; 3, 13; etc.

Values of $\Delta x'(s'_n)$ and $\Delta x'(s'_{n+10})$ are multiplied in multiplier 79 and values of $\Delta y'(s'_n)$ and $\Delta y'(s'_{n+10})$ are multiplied in multiplier 80. The output of multiplier 80 is subtracted from the output of multiplier 79 by subtractor 81 the output of which will then be $\cos I_1(s')$ in accordance with relations 8 and 9.

These values of $\cos I_1(s')$ may now be applied to a comparator for comparison with stored values of the same property of known curves as a function of arc length in the manner indicated above and generally illustrated in Figure 2. The invariant $I_1(s')$ has the advantage of requiring lower order derivatives for its computation than does $dR/ds$. Of course, when any single invariant is compared with standard values of the same invariant stored simply as a function of arc length, the comparator must include a shift register or a similar means for comparing the computed sequence of values in all possible phase relations with the stored values since it is assumed that the starting point at which the reader begins to follow the curve is arbitrary. Although this technique is inherently slower than plotting an invariant against a semi-invariant, it may in some instances be desirable due to the simpler invariant plots which are generally found.

Figure 9:
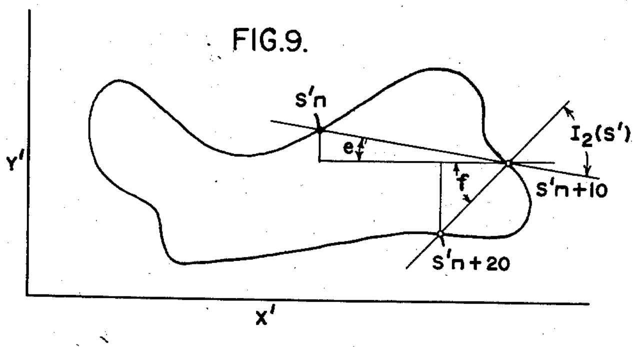
Figures 9 and 10 are graphs illustrating other invariant properties which may be utilized in carrying out the present invention.
Figure 10:
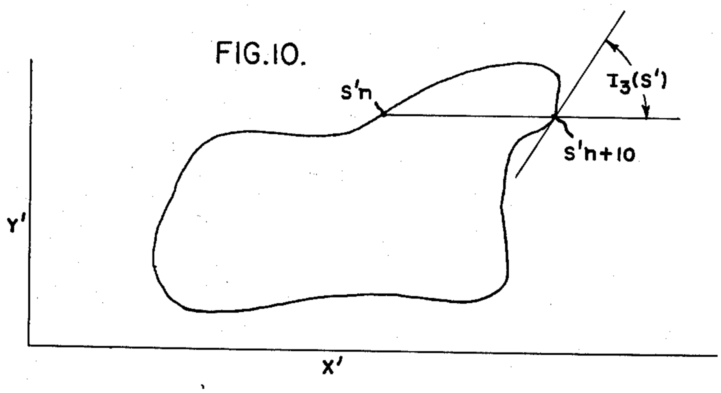

Other invariant properties which can be similarly computed and used are illustrated in Figures 9 and 10. In Figure 9 the angle $I_2(s')$ between two chords drawn respectively between points $S'_n$, $S'_{n+10}$ and $S'_{n+10}$, $S'_{n+20}$ is also an invariant under transformation 3. The value of $\cos I_2(s')$ may be found from relation 8 above by computing the lengths of the two chords $S'_n$, $S'_{n+10}$, and $S'_{n+10}$, $S'_{n+20}$ and using these lengths and the coordinate differences between points $S'_n$, $S'_{n+10}$, and $S'_{n+10}$, $S'_{n+20}$ to find sines and cosines of angles $e$ and $f$ to be used in an equation similar to Equation 8.

Similarly, as illustrated in Fig. 10, the angle $I_3(s')$ between a chord from point $s'_{n+10}$ and the tangent at point $s'_{n+10}$ is yet another invariant. Furthermore, the ratio of the chord length between points $S'_n$ and $s'_{n+10}$ to the total length L of the curve (or to another chord length) is still another invariant which in some applications may be simpler to compute and compare with similarly computed stored values.

As noted above, if any of these invariants are plotted as a function of arc length, the comparison or recognition equipment must be provided with means to take into account the possibility of a phase shift between the computed and stored values which arises from the fact that the curve reader may start at different points on the same curve. If a semi-invariant, such as $\log R(s)$, is plotted against arc length one has not only the phase shift problem, but also the problem arising from a constant term difference which arises when the unknown curve has been subjected to a magnification. By basing the system of Figures 4 and 5 on a plot of an invariant, $dR/ds$, against a semi-invariant, $\log R(s)$, it is possible to deal with the phase shift problem by the use of sequencing unit 69 and to eliminate the constant term difference of the semi-invariant by use of subtractors 73 and 75. This additionally affords a measure of the relative magnification. If, however, one wishes merely to recognize an unknown curve, considerable simplification of the system is possible by computing and plotting one true invariant as a function of another true invariant rather than as a function of either arc length or a semi-invariant.

If one invariant is computed and plotted as a function of another invariant, the computing and comparison apparatus does not have to deal with either the phase shift or the constant term difference problem. A set of graphs similar to those of Fig. 1 but illustrating the mathematical basis of a two invariant system is shown in Fig. 11 and a detailed block diagram is presented in Fig. 12 showing how the system of Figs. 4 and 5 may be correspondingly modified.

In Fig. 11 graph (*a*) shows a standard curve 85 which when subjected to the transformations 3 of translation, rotation, and magnification may appear as an unknown curve, 86, as shown in graph (*b*). The invariants $dR/ds$ and $\cos I_1(s)$ are computed for standard curve 85 and are stored as corresponding pairs of values for each point of the curve or, equivalently, are plotted against each other as shown at 87 in graph (*c*). Now when the same invariant functions are computed for the transformed unknown curve 86 and similarly plotted as shown at 88 in graph (*d*) it will be seen that plots 87 and 88 correspond exactly so that they may be directly compared.

Figure 12:
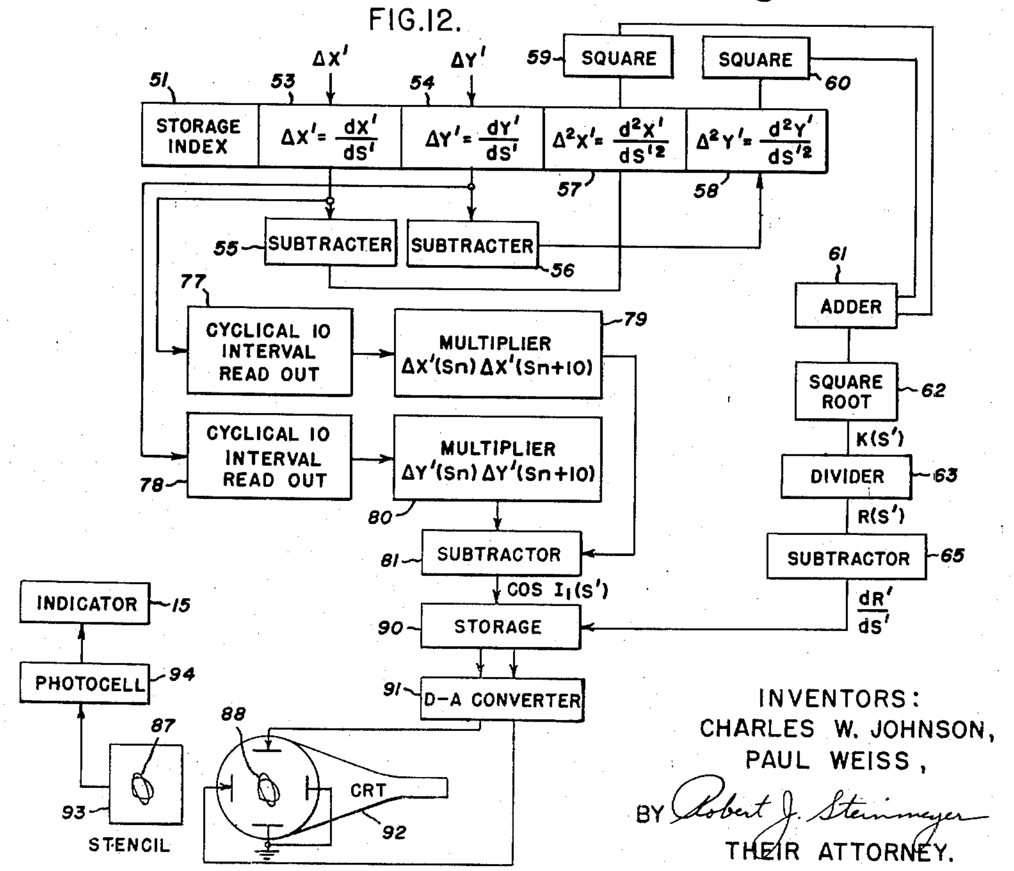
Figure 12 is a block diagram showing how the system of Figures 4 and 5 may be modified to utilize the properties illustrated in Figure 11.

Apparatus for carrying out this computing and comparison process is shown in Fig. 12. It will be understood that the same curve follower used in other embodiments is again used here and that the computing apparatus of Fig. 4 is again used up to and including storage or memory elements, 51, 53, 54, 57, and 58. Furthermore, $dR'/ds'$ can be computed in a manner similar to that used in the system of Fig. 4. Thus, subtractors 55 and 56 derive second differences from the first differences stored in elements 53 and 54. These second differences are read from storage elements 57 and 58 and squared by elements 59 and 60. The sum of these squares is then found by adder 61 and the square root of this sum is taken by element 62 which has an output $K(s')$. Divider 63 finds $R(s')$ from this output and subtractor 65 thence gives $dR'/ds'$ as explained above in connection with Fig. 4. There will be 100 values of $dR'/ds'$ which are fed to an element 90 comprising a storage medium so that values of $dR'/ds'$ and $\cos I_1(s')$ may be stored in pairs. That is to say, the first computed value of $dR'/ds'$ is given the same address as the first computed value of $\cos I_1(s')$ on parallel tracks of a magnetic drum, for example. This storing is desirable to insure correspondence between computed values for the same point on the curve if it should happen that the computing time for the two functions $dR/ds$ and $\cos I_1(s)$ is different.

$\cos I_1(s')$ is computed by the same technique used in the system of Fig. 8. That is to say, elements 77 and 78 read values of the first differences $\Delta x'$ and $\Delta y'$ from storage elements 53 and 54 cyclically at 10 interval increments as explained in connection with Fig. 8. Multipliers 79 and 80 then take products of values of first differences spaced 10 intervals apart and subtractor 81 takes the difference of these products thus producing an output equal to $\cos I_1(s')$ also as explained in connection with Fig. 8. These values of $\cos I_1(s')$ are stored in the order in which they are computed with corresponding values of $dR'/ds'$ in element 90 as noted above. That is to say, $\cos I_1(s')$ computed for the angle between tangents at points $s'_n$ and $s'_{n+10}$ is stored in correspondence with the value of $dR'/ds'$ at point $s'_n$.

These stored digital values are converted to continuous analog voltages by digital to analog converter 91. The analog voltages representing $\cos I_1(s')$ are applied to the horizontal deflection plates of a cathode ray tube 92 and the analog voltages representing $dR'/ds'$ are applied to the vertical deflection plates of cathode ray tube 92. The electron beam of tube 92 will thus be caused to trace out curve 88 on the face of the tube. Curve 88, of course, is the plot of the computed invariant characteristics of curve 86 which the curve follower has read.

A stencil 93 may be placed directly over the face of tube 92. Stencil 93 may conveniently consist of a translucent material which has opaquely printed on it the curve 87 representing the invariant characteristics of standard known curve 85. That is, the stencil 93 is one device which may be used as storage element 14 of Fig. 2. The amount of light transmitted through stencil 93 from the phosphor of tube 92 will be a minimum when curves 87 and 88 correspond at all points or in other words, when they are identical. This transmitted light is measured by a photocell 94 which actuates recognition indicator 15 when, for example, the photocell sees no light output transmitted through stencil 93 for a preselected time equal to at least one sweep around curve 88. It will of course be understood that provision for more than one standard curve 87 may be made by providing any desired number of cathode ray tubes each having a different associated stencil and all being connected in parallel with the output of digital to analog converter 91. It will also be understood that any other convenient storage and comparison technique could be used.

It will be noted that no matter where the curve follower starts to read the unknown curve, both $dR/ds$ and $\cos I_1(s)$ will again assume their initial values when the curve follower returns to the arbitrary starting point. That is to say, the plot of the two invariant characteristics of a closed curve must necessarily itself be a closed curve. Since a recognition can be detected by the photocell 94 whenever this plot 88 coincides with the curve 87 on the stencil for one full sweep around, it obviously makes no difference where the curve follower starts to read the curve. That is, the phase shift problem in the recognition apparatus is eliminated.

Furthermore, the constant term difference problem is also eliminated. Since the characteristics being plotted for comparison are both invariant under the transformations 3 of rotation, translation, and magnification each single standard stencil is sufficient to recognize any curve having the same shape as the standard curve no matter how the unknown curve may be positioned in the curve follower's reading area and no matter what its relative size may be.

In the system of Fig. 12 two independent invariants of the curve are computed. By an invariant is meant, as noted above, a quantity which varies with a point traversing the curve but which, for a given point on the curve, does not change when the curve is mapped on another curve by any succession of translations, rotations, and magnifications. The embodiment illustrated utilized $dR/ds$ and $\cos I_1(s)$ as the two invariants. Other invariants which could be used are $R(s)/L$, where $R(s)$ is the radius of curvature and L is the total arc length, and $R(d^2R(s)/ds^2)$, where the expression is parenthesis is the second derivative of the radius of curvature with respect to arc length. Additionally, any of the invariants earlier mentioned in connection with Figs. 7, 9, and 10 could also be used in a two invariant system of the type shown in Fig. 12.

In general, depending upon the type of curve which a particular system is intended to read, one or more invariant or semi-invariant properties of the curve may be chosen to identify it. Values of the particular property or properties of the curve may then be computed and compared with a standard store of similar values of the same property or properties of standard curves in the manner illustrated above. A recognition is indicated when the computed values for the unknown curve and the stored value for any particular standard curve have a relationship to each other such that both must necessarily have been computed from curves having all of their characteristics identical (such as the eccentricity of an ellipse) except those characteristics (such as the size, position, or orientation of the ellipse) which vary under transformations with respect to which the property for which values are computed is invariant to within at most a constant term.

While the principles of the invention have now been made clear in illustrative embodiments, there will be immediately obvious to those skilled in the art many modifications in structure, arrangement, proportions, the elements and components used in the practice of the invention, and otherwise, which are particularly adapted for specific environments and operation requirements, without departing from these principles. The appended claims are therefore intended to cover and embrace any such modifications, within the limits only of the true spirit and scope of the invention.

What we claim as new and desire to secure by Letters Patent of the United States is:

1. Apparatus for recognizing an unknown curve independently of its registration with a known curve comprising means for selecting at least one known curve, means for computing values of at least one property of said known curve, said property having values which are invariant to within at most a constant additive term when the transformations of at least translation, rotation and magnification are applied to said known curve, means for storing said values of said property for said known curve, means for deriving at least one voltage having at least one characteristic the value of which varies in a manner determined by the shape of an unknown curve desired to be recognized, means for computing from said voltage values of the same said property of said unknown curve as was used in computing values for said known curve, means for comparing said last computed values with said stored values, and means for indicating a recognition when said last computed values for said unknown curve and said stored values for said known curve have a predetermined relationship to each other.

2. The apparatus as set forth in claim 1 wherein said constant additive term is necessarily zero when the transformations of at least translation, rotation, and magnification are applied to said curve.

3. Apparatus for recognizing an unknown curve which comprises means for deriving voltages having values dependent upon the shape of an unknown curve means for supplying voltages having values dependent upon the shape of a known curve, both said voltages respectively representing properties which are invariant to within at most a constant additive term when the transformations of at least translation, rotation and magnification are applied to the unknown and the known curves and means for comparing said respective voltages.

4. Apparatus for recognizing an unknown curve independently of its registration with a known curve comprising means for selecting at least one known curve, means for computing for said known curve values of two properties of the curve as functions of its arc length, a first of said properties having values which are invariant and a second of said properties having values which are invariant to within at most a constant additive term when the transformations of at least translation, rotation, and magnification are applied to said curve, means for storing said values of one of said properties as a function of the values of the other of said properties; means for deriving at least one voltage having at least one characteristic the value of which varies in a manner determined by the shape of an unknown curve desired to be recognized, means for computing from said voltage values of the same two said properties of said unknown curve as were used in computing values for said known curve, means for comparing the computed values for said unknown curve with the stored values for said known curve, and means for indicating a recognition when said values of said first property are the same for said known curve and for said unknown curve and concurrently said values of said second property of said respective curves are the same except for a difference of at most a constant term.

5. Apparatus for recognizing an unknown curve independently of its registration with a known curve comprising means for selecting at least one known curve, means for computing for said known curve values of two properties of the curve as a function of its arc length, both of said properties having values which are invariant when the transformations of at least translation, rotation, and magnification are applied to said curve, means for storing said values of one of said properties as a function of the values of the other of said properties; means for deriving at least one voltage having at least one characteristic the value of which varies in a manner determined by the shape of said unknown curve, means for computing from said voltage values of the same two said properties of said unknown curve as were used in computing values for said known curve, means for comparing the computed values for said unknown curve with the stored values for said known curve, and means for indicating a recognition when said values of both of said properties are concurrently and respectively the same for said known curve and for said unknown curve.

6. Apparatus for recognizing and measuring the relative size of an unknown curve comprising means for selecting a group of known curves, means for computing for each of said known curves a first set of values representing the rate of change with respect to its arc length of a measure of its curvature and a second set of values representing the logarithm of its curvature as a function of its arc length, means for storing said first set of values as a function of said second set of values for each of said known curves; means for deriving at least one voltage having at least one characteristic the value of which varies in a manner determined by the shape of said unknown curve, means for computing from said voltage the same two sets of values for said unknown curve as were computed for said known curve, means for storing said last computed sets of values, means for comparing the stored sets of values for said unknown curve with the sets of values for said known curves, means for indicating a recognition when said first set of values for said unknown curve and said first set of values for one of said known curves are the same and concurrently the sets of values of said logarithm of said measure of curvature of said known and said unknown curves are the same except for a difference of at most a constant additive term, and means for displaying said constant term difference between said sets of values of said logarithm as a measure of the relative sizes of said known and said unknown curves.

7. Apparatus for recognizing an unknown curve independently of its registration with a known curve which comprises means for deriving at least one voltage which varies in accordance with the shape of an unknown curve, means for computing from said voltage values of at least one property of said unknown curve that are invariant to within at most a constant additive term when the transformations of at least translation, rotation and magnification are applied to said unknown curve, means for comparing said computed values to values of the same property computed from at least one known curve, and means for indicating a recognition when the computed values for said known and unknown curves have a predetermined relationship to each other.

8. Curve recognition apparatus comprising, means to display an unknown curve on a reading area, curve reading means to produce at least one voltage having at least one characteristic the value of which varies in a manner determined by the shape of said unknown curve, means to compute from said voltage values of at least one property of said curve, said property having values which are invariant to within at most a constant term when the transformations of at least translation, rotation, and magnification are applied to said curve; means to store values of the same said property computed for at least one known curve; means to compare said computed values for said unknown curve with said stored values for said known curve, and means to indicate a recognition when said values of said property for said unknown curve and said values of said property for said known curve have a predetermined relationship to each other.

9. Curve recognition apparatus comprising, means to display an unknown curve on a reading area, curve reading means to produce at least one voltage having at least one characteristic the value of which varies in a manner determined by the shape of said curve, means to compute from said voltage values of two properties of said curve as a function of its arc length, both of said properties having values which are invariant when the transformations of at least translation, rotation, and magnification are applied to said curve; means to store values of the same two said properties computed for at least one known curve, said stored values of said first property being arranged as a function of said stored values of said second property, means to compare said computed values for said unknown curve with said stored values for said known curve, and means to indicate a recognition when said values of said respective properties of said unknown curve and said known curve are respectively and concurrently the same.

10. Curve recognition apparatus comprising, means to display an unknown curve on a reading area, curve reading means to produce a pair of voltages representing the coordinates with respect to said reading area of points taken sequentially along said curve, means to compute from said voltages values of two properties of said curve, a first of said properties being invariant and a second of said properties being invariant to within at most a constant term when the transformations of at least translation, rotation, and magnification are applied to said curve, means to store said computed values; means to store the values of the same two said properties computed for each of a group of known curves; means to compare said stored values for said unknown curve with said stored values for each of said known curves, and means to indicate a recognition when said values of said first property are the same for one of said known curves and for said unknown curve and concurrently said values of said second property of said respective curves are the same except for a difference of at most a constant term.

11. Curve recognition apparatus comprising, means to display an unknown curve on a reading area, curve reading means to produce a pair of voltages representing the continuous variation of the value of two coordinates of said curve with respect to said reading area at points taken sequentially along said curve, means to compute the total arc length of said curve from said voltages, means to determine an increment of arc length which is an integral sub-multiple of said total arc length, means to sample each of said pair of voltages at points which are spaced along said curves at intervals equal to said increment of arc length; means to compute from said samples values of at least one property of said curve as a function of its arc length, said property having values which are invariant to within at most a constant term when the transformations of at least translation, rotation and magnification are applied to said curve; means to store values of the same said property computed for a group of known curves; means to compare said computed and said stored values; and means to indicate a recognition when said values have a predetermined relationship.

12. Curve recognition apparatus comprising, means to display an unknown curve on a reading area, curve reading means to produce a pair of voltages representing the continuous variation of the value of two coordinates of said curve with respect to said reading area at points taken sequentially along said curve, means comprising an analog computer to compute the total arc length of said curve from said voltages, means to determine an increment of arc length which is an integral sub-multiple of said total arc length, means to sample each of said pair of voltages at points which are spaced along said curve at intervals equal to said increment of arc length; means to convert said sampled values of analog voltages to digitally encoded values; means comprising a digital computer to compute from said encoded values a sequence of values of a property of said curve, said property having values which are invariant when the transformations of at least translation, rotation, and magnification are applied to said curve, means to store values of the same said property computed for a group of known curves; means to compare said computed and said stored values; and means to indicate a recognition when said computed and said stored values have a predetermined relationship to each other.

13. Curve recognition and measuring apparatus comprising, means to display an unknown curve on a reading area, curve reading means to produce voltages representing the coordinates with respect to said reading area of points taken sequentially along said curve; means to derive from said coordinate voltages a first set of voltages representing values of a first property of said curve, said property having values which are invariant when the transformations of translation, rotation, and magnification are applied to said curve, means to derive from said coordinate voltages a second set of voltages representing values of the logarithm of a measure of curvature of said curve as a function of its arc length, means to store said first set of values represented by said first set of derived voltages as a function of said second set of values represented by said second set of derived voltages; storage means containing first and second sets of values for each of a group of known curves, said first set of values being arranged as a function of said second set of values, said stored sets of values representing the same properties of said known curve as do the computed values of said unknown curve, means to compare the stored sets of values for said unknown curve with the stored sets of values for said known curves, means to indicate a recognition when said first set of values of said unknown curve is the same as said first set of values of one of said known curves and concurrently said second set of values for said unknown curve is the same as said second set of values for said known curve except for a difference of at most a constant term, and means to display said constant term difference between said second sets of values as a measure of the size of said unknown curve relative to said known curve.

14. Curve recognition apparatus comprising, first means to display an unknown curve on a reading area, second means to produce a pair of voltages representing the continuous variation of the value of two coordinates of said curve with respect to said reading area at points taken sequentially along said curve, third means to read and store the values of the amplitude of said voltages at the first of said points, fourth means to compute from said pair of voltages the total arc length from said first point along said curve to each of said points, fifth means to sample the value of said arc length whenever said pair of voltages simultaneously have amplitudes the value of which are respectively the same as the stored values of the respective amplitudes of said first point; sixth means to reset said fourth computing means to zero when said value of arc length has been sampled by said fifth means, seventh means to divide said sampled value of arc length by an integral factor, the quotient being an increment of arc length; eighth means to store the value of said increment of arc length; ninth means to sample the values of said pair of voltages produced by said second means whenever the arc length computed by said fourth means has a value equal to the value of said increment of arc length stored by said eighth means, tenth means to compute from said value sampled by said ninth means values as a function of arc length of at least one property of said curve having values which are invariant under the transformations of at least translation and rotation; eleventh means to store corresponding values of the same said property of at least one known curve; twelfth means to compare the values computed by said tenth means with the values stored by said eleventh means, and thirteenth means to indicate a recognition when said compared values have a predetermined relationship to each other.

15. Apparatus for recognizing an unknown curve independently of its registration with a known curve, said apparatus comprising, means to derive at least one electrical signal to represent values of a property of said unknown curve which is invariant when the transformations of translation and rotation are applied to said unknown curve, means responsive to said derived signal for comparing said values represented by said derived signal to values of the same property derived from a known curve, and means for indicating a recognition when the values for said known and said unknown curves have a predetermined relationship to each other.

16. Apparatus for recognizing an unknown curve independently of its registration with a known curve, said apparatus comprising, means to derive a first electrical signal to represent values of a first property of said unknown curve, means to derive a second electrical signal to represent values of a second property of said unknown curve as a function of corresponding values of said first property of said curve, each of said properties being invariant when the transformations of translation and rotation are applied to said unknown curve; means to represent in the same functional relationship corresponding values of the same two properties for a known curve; means responsive to said first and second derived signals for comparing said functionally related values represented for said unknown curve to said functionally related values represented for said known curve; and means to indicate a recognition when said values of said respective properties of said unknown curve and said known curve respectively and concurrently have a predetermined relationship to each other.

17. Curve recognition apparatus comprising, means to display an unknown curve on a reading area, curve reading means to produce at least one voltage having at least one characteristic the value of which varies in a manner determined by the shape of said unknown curve, means to compute from said voltage values of at least one property of said curve, said property having values which are invariant to within at most a constant term substantially equal to zero when the transformations of at least translation, rotation, and magnification are applied to said curve; means to store values of the same said property computed for at least one known curve; means to compare said computed values for said unknown curve with said stored values for said known curve, and means to indicate a recognition when said values of said property for said unknown curve and said values of said property for said known curve have a predetermined relationship to each other.

References Cited in the file of this patent

UNITED STATES PATENTS

| | | |
|---|---|---|
| 2,616,983 | Zworykin | Nov. 4, 1952 |
| 2,679,636 | Hillyer | May 25, 1954 |
| 2,838,602 | Sprick | June 10, 1958 |